(12) United States Patent
Wang et al.

(10) Patent No.: US 12,150,187 B2
(45) Date of Patent: Nov. 19, 2024

(54) TECHNIQUES FOR CONFIGURING SEARCH SPACES FOR REVERSE SIDELINK COMMUNICATION

(71) Applicant: QUALCOMM Incorporated, San Diego, CA (US)

(72) Inventors: Xiaojie Wang, Hillsborough, NJ (US); Jing Sun, San Diego, CA (US); Piyush Gupta, Bridgewater, NJ (US); Lik Hang Silas Fong, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 17/382,876

(22) Filed: Jul. 22, 2021

(65) Prior Publication Data
US 2022/0030648 A1    Jan. 27, 2022

Related U.S. Application Data

(60) Provisional application No. 63/056,354, filed on Jul. 24, 2020.

(51) Int. Cl.
*H04W 72/0453*    (2023.01)
*H04L 5/00*    (2006.01)
(Continued)

(52) U.S. Cl.
CPC .......... *H04W 76/14* (2018.02); *H04L 5/0046* (2013.01); *H04L 5/0053* (2013.01);
(Continued)

(58) Field of Classification Search
None
See application file for complete search history.

(56) References Cited

U.S. PATENT DOCUMENTS 11,601,948 B2 *    3/2023   Wang .................. H04W 72/542
2018/0288749 A1 *   10/2018   Sun ....................... H04L 5/0048
(Continued)

FOREIGN PATENT DOCUMENTS

WO    WO-2019192701 A1 *   10/2019   .............. H04W 4/40

OTHER PUBLICATIONS

U.S. Appl. No. 62/906,990, filed Sep. 27, 2019 (Year: 2019).*

*Primary Examiner* — Jay L Vogel
(74) *Attorney, Agent, or Firm* — Arent Fox, LLP

(57) ABSTRACT

Aspects of the present disclosure provide techniques for configuring a search space for reverse sidelink communications between one or more sensors/actuators (SAs) and programmable logic controller (PLC) in internet of things (IoT) applications. Particularly, the techniques described herein configure a search space (e.g., subset of all available sub-channels) for reception of sidelink packets (e.g., physical sidelink control channel (PSCCH) and physical sidelink shared channel (PSSCH)) that may be received at the PLC from the one or more SAs. In some examples, the PLC may monitor the subset of subchannels and decode the sidelink packets received on the subset of subchannels without the need for the PLC to perform blind decoding of all sidelink sub-channels as is currently required in conventional systems. Thus, the disclosed techniques reduce latency and maximize the resource utilization (e.g., by using less processing power and bandwidth) for sidelink communications.

17 Claims, 6 Drawing Sheets

(51) Int. Cl.
*H04W 72/27* (2023.01)
*H04W 76/14* (2018.01)
*H04W 72/56* (2023.01)

(52) U.S. Cl.
CPC ....... *H04W 72/0453* (2013.01); *H04W 72/27* (2023.01); *H04L 5/001* (2013.01); *H04W 72/56* (2023.01)

(56) References Cited

U.S. PATENT DOCUMENTS

| | | | |
|---|---|---|---|
| 2020/0059908 A1* | 2/2020 | Joseph | H04W 76/25 |
| 2020/0059915 A1* | 2/2020 | Lee | H04W 56/0015 |
| 2020/0275425 A1* | 8/2020 | Cao | H04L 1/0003 |
| 2021/0204250 A1* | 7/2021 | Ashraf | H04W 72/56 |
| 2021/0314935 A1* | 10/2021 | Luo | H04W 72/51 |
| 2022/0015070 A1* | 1/2022 | Chen | H04W 72/1263 |
| 2022/0191875 A1* | 6/2022 | Panteleev | H04L 5/0053 |
| 2022/0201716 A1* | 6/2022 | Yi | H04W 72/0453 |
| 2022/0225292 A1* | 7/2022 | Mohammad Soleymani | H04W 72/20 |

* cited by examiner

TECHNIQUES FOR CONFIGURING SEARCH SPACES FOR REVERSE SIDELINK COMMUNICATION

CROSS-REFERENCE TO RELATED APPLICATION(S)

The present application claims benefit of U.S. Provisional Application No. 63/056,354 entitled "TECHNIQUES FOR CONFIGURING SEARCH SPACES FOR REVERSE SIDELINK COMMUNICATION" filed Jul. 24, 2020, which is assigned to the assignee hereof and hereby expressly incorporated by reference herein.

TECHNICAL FIELD

The present disclosure relates to wireless communication systems, and more particularly, to techniques for configuring search spaces for reverse sidelink communication between one or more sensors/actuators (SAs) and programmable logic controller (PLC) in internet of things (IoT) applications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

SUMMARY

Aspects of the present disclosure provide techniques for configuring a search space for reverse sidelink communications between one or more sensors/actuators (SAs) and programmable logic controller (PLC) in internet of things (IoT) applications. Particularly, the techniques described herein configure a search space (e.g., subset of all available sub-channels) for reception of sidelink packets (e.g., physical sidelink control channel (PSCCH) and physical sidelink shared channel (PSSCH)) that may be received at the PLC from the one or more SAs. In some examples, the PLC may monitor the subset of subchannels and decode the sidelink packets received on the subset of subchannels without the need for the PLC to perform blind decoding of all sidelink sub-channels as is currently required in conventional systems. Thus, the disclosed techniques reduce latency and maximize the resource utilization (e.g., by using less processing power and bandwidth) for sidelink communications.

In one example, a method for wireless communication is disclosed. The method may include configuring, at a first user equipment (UE), a search space for reception of sidelink data to be transmitted from one or more second UEs to the first UE, wherein the search space is a subset of subchannels from available subchannels. The method may further include monitoring, at the first UE, the subset of subchannels for sidelink transmissions from the one or more second UEs based on configuration of the search space. The method may further include decoding the sidelink data transmitted from the one or more second UEs based on the monitoring of the subset of subchannels.

In another example, an apparatus for wireless communications. The apparatus may include a memory having instructions and a processor configured to execute the instructions to configure, at a first user equipment (UE), a search space for reception of sidelink data to be transmitted from one or more second UEs to the first UE, wherein the search space is a subset of subchannels from available subchannels. The processor may further be configured to execute the instructions to monitor, at the first UE, the subset of subchannels for sidelink transmissions from the one or more second UEs based on configuration of the search space. The processor may further be configured to execute the instructions to decode the sidelink data transmitted from the one or more second UEs based on the monitoring of the subset of subchannels.

In some aspects, a non-transitory computer readable medium includes instructions stored therein that, when executed by a processor, cause the processor to perform the steps of configuring, at a first user equipment (UE), a search space for reception of sidelink data to be transmitted from one or more second UEs to the first UE, wherein the search space is a subset of subchannels from available subchannels. The processor may further execute the instructions for monitoring, at the first UE, the subset of subchannels for sidelink transmissions from the one or more second UEs based on configuration of the search space. The processor may further execute the instructions for decoding the sidelink data transmitted from the one or more second UEs based on the monitoring of the subset of sub channels.

In certain aspects, another apparatus for wireless communication is disclosed. The apparatus may include means for configuring, at a first user equipment (UE), a search space for reception of sidelink data to be transmitted from one or more second UEs to the first UE, wherein the search space is a subset of subchannels from available subchannels. The apparatus may further include means for monitoring, at the first UE, the subset of subchannels for sidelink transmissions from the one or more second UEs based on configuration of the search space. The apparatus may further include means for decoding the sidelink data transmitted from the one or more second UEs based on the monitoring of the subset of subchannels.

In another example, another method for wireless communication is disclosed. The method may include receiving, at a first user equipment (UE), a reverse sidelink search space configuration information from a second UE, wherein the reverse sidelink search space configuration information identifies the subchannels that the second UE monitors for sidelink traffic. The method may further include determining one or more subchannels for transmissions for the first UE based on the reverse sidelink search space configuration information. The method may further include transmitting a sidelink packet to the second UE over the one more subchannels.

In another example, an apparatus for wireless communications. The apparatus may include a memory having instructions and a processor configured to execute the instructions to receive, at a first UE, a reverse sidelink search space configuration information from a second UE, wherein the reverse sidelink search space configuration information identifies the subchannels that the second UE monitors for sidelink traffic. The processor may further be configured to execute the instructions to determine one or more subchannels for transmissions for the first UE based on the reverse sidelink search space configuration information. The processor may further be configured to execute the instructions to transmit a sidelink packet to the second UE over the one more subchannels.

In some aspects, a non-transitory computer readable medium includes instructions stored therein that, when executed by a processor, cause the processor to perform the steps of receiving, at a first UE, a reverse sidelink search space configuration information from a second UE, wherein the reverse sidelink search space configuration information identifies the subchannels that the second UE monitors for sidelink traffic. The processor may further execute the instructions for determining one or more subchannels for transmissions for the first UE based on the reverse sidelink search space configuration information. The processor may further execute the instructions for transmitting a sidelink packet to the second UE over the one more subchannels.

In another example, another apparatus for wireless communication is disclosed. The apparatus may include means for receiving, at a first UE, a reverse sidelink search space configuration information from a second UE, wherein the reverse sidelink search space configuration information identifies the subchannels that the second UE monitors for sidelink traffic. The apparatus may further include means for determining one or more subchannels for transmissions for the first UE based on the reverse sidelink search space configuration information. The apparatus may further include means for transmitting a sidelink packet to the second UE over the one more subchannels.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
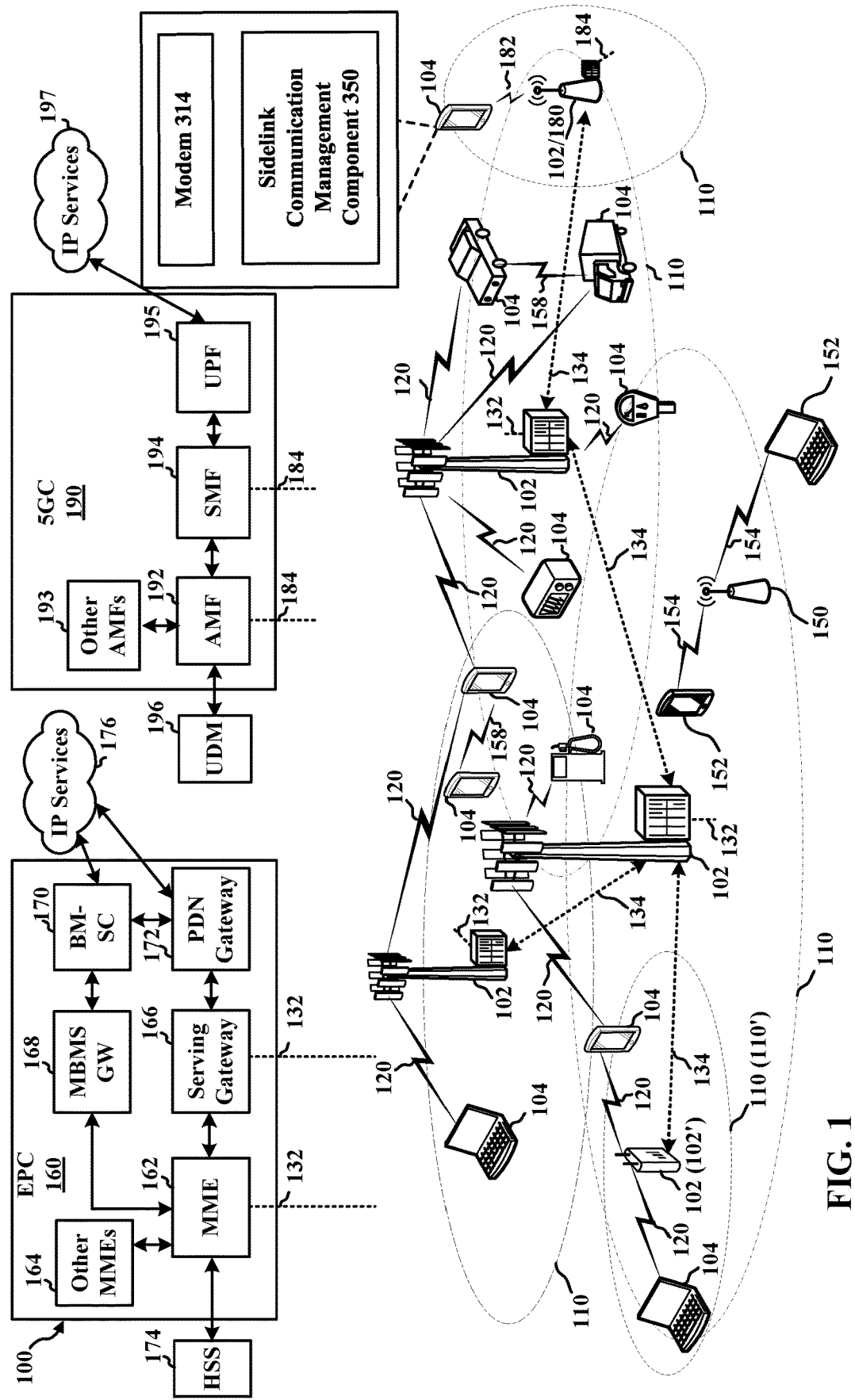
FIG. 1 is a schematic diagram of an example of a wireless communications system in accordance with aspects of the present disclosure.

In recent years, with the introduction of a myriad of smart handheld devices, user demands for mobile broadband has dramatically increased. For example, the drastic growth of bandwidth-hungry applications such as video streaming and multimedia file sharing are pushing the limits of current cellular systems. One solution to address the increased demand for bandwidth is reliance on functionalities for direct UE to UE communication (which may also be referred to as device-to-device (D2D) or sidelink communication), which allows two nearby devices (e.g., UEs) to communicate with each other in the cellular bandwidth without base station involvement or with limited base station involvement. However, introduction of D2D poses new challenges.

For example, to receive sidelink packets, a receiver UE ("Rx UE") generally performs blind decoding of all sidelink sub-channels. And while the current implementations of NR sidelink has focused on cellular vehicle-to-everything (C-V2X) technology where the number of sub-channels is typically small (e.g., 27 sub-channels), the same is not true for all applications of sidelink communications (e.g., internet of thing (IoT) devices).

Indeed, in IoT applications for instance, sidelink communications can be enabled between direct programmable logic controller (PLC) and a host of sensors/actuators (SAs). For example, a single PLC may control 20-50 SAs located on a robotic arm used for manufacturing. Because of the implementation of IoT applications, there may be tight latency (e.g., 1-2 milliseconds) and ultra-reliability requirements (e.g., $10^{-6}$ error rate) for communications between the PLC and the plurality of SAs. Thus, where the PLC is controlling the robotic arm that has 20-50 SAs, even a minor delay in communication may have adverse consequences (e.g., a weld being placed in the wrong location). As such, coordinating communication between the PLC and the SAs through a base station (gNB) may require multiple over-the-air (OTA) transmissions and adversely impact the latency and reliability.

IoT traffic may also have smaller packet size (e.g., 32-256 bytes) compared to other communications (e.g., cellular). Thus, the overall bandwidth requirement for IoT may be low (e.g., two resource blocks might be sufficient for many communications). However, SAs may also have constraints on UE capabilities in terms of bandwidth and processing power compared to typical UEs (e.g., smart phones). This is because unlike smart phones, SAs are typically affixed to controlled devices (e.g., robotic arm in above example) and do not require the full capabilities such as user interface, enhanced memory, and processing power due to the limited utilization of the SAs. And while each packet transmitted in IoT may individually be small in size (e.g., 32-256 bytes), the overall bandwidth may be large for IoT with dedicated frequency bands because of the high number of SAs (e.g., 20-50 SAs) that may be controlled by a single controlled PLC. For at least the foregoing reasons, communications for IoT devices (e.g., between PLC and plurality of SAs) may benefit from sidelink communication as opposed to being controlled via a base station that schedules resources between the PLC and the SAs. Similarly, other applications other than IoT may also have such low latency requirements that would benefit from sidelink communication.

However, as noted above, in contrast to C-V2X, many applications for sidelink communication such as IoT have significant number of sub-channels (e.g., 50-100 for IoT). Blind decoding all the sub-channels, as is conducted in conventional sidelink communications applications (e.g., C-V2X), may exceed UE capabilities and adversely impact the latency and reliability constraints of both the PLC and/or the SAs.

Aspects of the present disclosure provide techniques for configuring a search space for reverse sidelink communications from one or more SAs to PLC in IoT applications. And while the present disclosure is described with reference to PLC and SAs, it should be appreciated that the techniques can be implemented on any UEs and indeed the PLC and/or SAs are individually UEs that may communicate with each other on a sidelink channel. Further, for purposes of present disclosure, "reverse sidelink communication" may refer to communication from the one or more SAs (e.g., a plurality of first UEs) to the PLC (e.g., a second UE). Conversely, "forward sidelink communication" may refer to communication from the PLC (e.g., a first UE) to the one or more SAs (e.g., a plurality of second UEs).

The term "search space" may correspond to a set of control channel elements (CCEs) that constitute a control or data region for the one or more UEs that may be allocated. Simply stated, a search space is a location in resource blocks where the receiver UE may search for PSCCH and/or PSSCH (e.g., data packet). The CCE indices in a given configurable control resource set (CORESET) for the PSCCH may be calculated based on a hashing functions.

The techniques described herein configure a search space (e.g., subset of all available sub-channels) to decode the sidelink packets (e.g., PSCCH and/or PSSCH) transmitted between a first UE and a second UE over sidelink communication without the need for the receiver UE (e.g., second UE) to perform blind decoding of all sidelink sub-channels as is currently required in conventional systems. Thus, the disclosed techniques reduce latency and maximize the resource utilization (e.g., by using less processing power and bandwidth) for sidelink communications.

Specifically, the techniques described herein configure a search space (e.g., subset of all available sub-channels) for reception of sidelink packets (e.g., physical sidelink control channel (PSCCH) and physical sidelink shared channel (PSSCH)) that may be received at the PLC from the one or more SAs. In some examples, the PLC may monitor the subset of subchannels and decode the sidelink packets received on the subset of subchannels without the need for the PLC to perform blind decoding of all sidelink sub-channels.

In some examples, the PLC may configure reverse sidelink common search space (RSL-CSS) for a plurality of SAs in order to indicate that the PLC is monitoring the RSL-CSS for all the SAs associated with the PLC. Therefore, in some aspects, the one or more SAs may transmit sidelink packets to the PLC over the RSL-CSS that is a subset of all available subchannels. In other examples, the PLC may configure reverse sidelink group CSS (RSL-Group-CSS) for a group of SAs of all the SAs associated with the PLC. In such instance, the PLC may indicate to the group of SAs that the PLC may monitor the RSL-Group-CSS for sidelink packets transmitted from the group of SAs.

Additionally or alternatively, the PLC may configure reverse sidelink user-specific search space (RSL-USS) to a specific SA that may be for a high priority traffic. In some instances, each SA may be allocated a priority level. To this end, the PLC may configure at least one SA from the plurality of SAs with RSL-USS for reverse sidelink communication, where the SA is allocated higher priority level than the priority levels of other SAs associated with the PLC. For example, a first SA (e.g., first UE) may be allocated a first priority level, a second SA (e.g., second UE) may be allocated a second priority level, and a third second SA (e.g., third UE) may be allocated a third priority level. A first, second, and third SAs may collectively be associated with the PLC.

Thus, as an example, the PLC may configure RSL-CSS for all three SAs (e.g., first, second, and third SAs), and separately configure a RSL-Group-CSS for a group of SAs such as second and third SAs. Finally, in some examples, the PLC may configure a RSL-USS for a first SA that is allocated a first priority level that is higher priority than the priority levels allocated to second and third SAs, respectively. In some aspects, the priority allocation may be based on either hardware-specific (e.g., specific to the hardware) or traffic-specific (e.g., dynamically switch to one of different SAs based on the priority of the traffic that may need to be transmitted from one of the SAs to the PLC).

In some examples, the RSL-USS may not indicate the resource grant or reservations for the SAs. Instead, either the base station may assign resources within the RSL-USS to the SA (e.g., Mode 1) or the high-priority SA may autonomously perform channel sensing and select resources within RSL-USS for transmission of sidelink packet (e.g., Mode 2). Alternatively, in some aspects, the RSL-USS resources may be reserved by base station or the PLC for the high-priority SA. In such instance, the SA would not need to wait for a channel grant (mode 1) or perform channel sensing (mode 2) to initiate a sidelink transmission to the PLC for high priority SAs. However, as noted above, majority of SAs may generally transmit in either RSL-CSS or RSL-Group-CSS in order to minimize bandwidth utilization.

In one or more examples, the base station may instruct the PLC of the reverse sidelink search space (RSL-SS) configuration based on resource pool usage by other PLCs in communication with the base station. Particularly, while the PLC may be associated with a plurality of SAs, a plurality of PLCs may be within a coverage area of a base station sharing resources. To this end, the base station may share the resource pool configuration information regarding the neighboring PLCs with one or more PLCs such that each PLC may configure RSL-SS accordingly. In other instances, each PLC may autonomously configure its own RSL-SS and inform of the configuration to the base station. The base station may thereafter determine whether any of the neighboring PLCs may have selected any conflicting resource pool configurations for RSL-SS, and therefore instruct the PLCs of remedial measures (e.g., messaging for alternative resource allocations).

Once the RSL-SS (e.g., RSL-CSS, RSL-Group-CSS, RSL-USS) are configured, the PLC notifies the plurality of SAs of the configuration. Thereafter, the PLC continues to monitor the channels associated with the configurations for sidelink packets transmitted by the SAs and decode any sidelink packets that may be transmitted by SAs. By limiting the number of channels that PLC may monitor to those configured for RSL-SS, the PLC may reduce latency and maximize the resource utilization (e.g., by using less processing power and bandwidth) for sidelink communications since the PLC does not need to perform blind decoding of all sidelink sub-channels.

In some examples, the PLC monitors the channels based on an order of the search space. Particularly, the PLC may monitor the bandwidth in the search space in the following order: (1) RSL-USS, (2) RSL-Group-CSS, (3) RSL-CSS, (4) search spaces of neighboring PLCs (e.g., data from other UEs outside the group associated with the PLC).

Additionally, as noted above, a search space is a location in resource blocks where the receiver UE may search for PSCCH and/or PSSCH (e.g., data packet). The CCE indices in a given configurable control resource set (CORESET) for the PSCCH may be calculated based on a hashing functions. Thus, in some instances, one or more parameters for the hashing function for allocation of search space subchannels for RSL-USS, RSL-Group-CSS, RSL-CSS may be a function of one or more of PLC identification (ID), SA ID, or slot index.

In some instances, in order to maintain channel diversity and minimize interference, the parameters used in the hashing function for search space subchannel selection for forward sidelink communication may be different than the parameters that may be used for the hashing function for search space subchannel selection for reverse sidelink communication. For example, while the forward sidelink communication may configure a search space that is based on a hashing function that is a function of PLC ID, the reverse sidelink communication may be configure the search space that is based on the hashing function that is a function of SA ID. Thus, while the same hashing function (e.g., equation 1) may be implemented for determining the CCE indices for both the forward sidelink communication and the reverse sidelink communication, two different results may be output given the different parameters used for hashing function. In other examples, the selected ID may also be modified in at least one direction (e.g., by a random number) in order to obtain channel diversity between forward and reverse sidelink communication. Additionally or alternatively, the search spaces may be configured by using different hashing functions altogether between the forward sidelink and reverse sidelink communication.

The search spaces for PSCCH sidelink communication may also be designed in a number of different ways. Indeed, in one example, the configured search spaces may occupy contiguous subchannels with different offset and length from a reference point. In another example, the search spaces may uniformly select PSCCH locations with a random seed (e.g., NR PSDCH) with a number of subchannels that are indicated. In yet another example, PSCCH location may be randomly selected with a random seed with a number of channels indicated. In each of the three examples, the maximum PSSCH allocation size may be smaller than the total number of subchannels.

Various aspects are now described in more detail with reference to the FIGS. 1-5. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some UEs 104 of the wireless communication system may have a modem 514 and a sidelink communication management component 350 (see FIG. 3) to configure a search space for sidelink communications between a plurality of UEs. In some aspects, the UE 104 may function as PLC or SA in an IoT application. The sidelink communication management component 350, when operating as a PLC, may configure a search space (e.g., subset of all available sub-channels) for reverse sidelink communications from one or more SAs to PLC in IoT applications in order to minimize decoding the number of channels that the UE 104 (e.g., PLC) may need to decode to receive sidelink traffic from another UE 104 (e.g., one or more SAs). In some aspects, the sidelink communication management component 350 may configure the sidelink bandwidth as one of RSL-CSS, RSL-Group-CSS, or RSL-USS that indicates to one or more SAs (e.g., second UEs 104) that the PLC (e.g., first UE 104) is monitoring the specified subchannels for sidelink traffic from the one more SAs associated with the PLC.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2A:
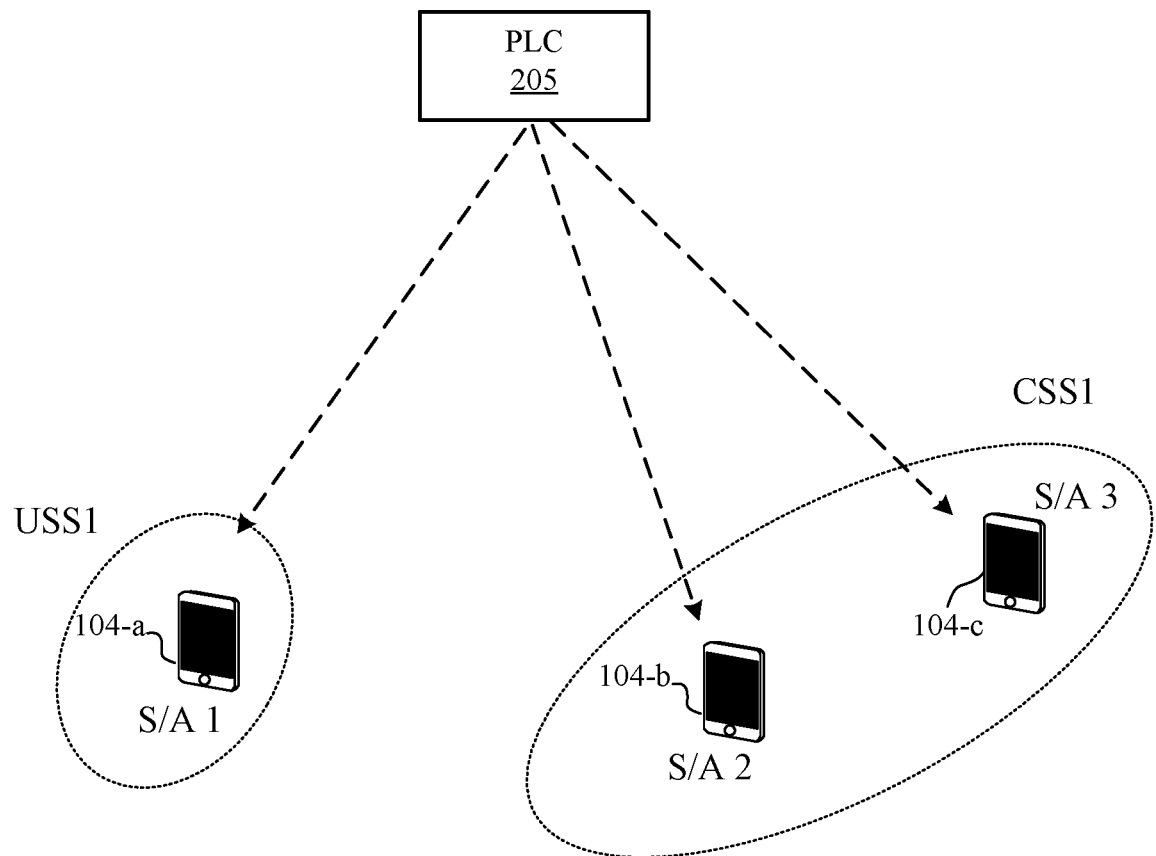
FIG. 2A is a schematic diagram of an example of a wireless communication system implementing forward sidelink communication in IoT applications accordance with aspects of the present disclosure.

FIG. 2A is a schematic diagram 200 of an example of a wireless communication system implementing forward sidelink communication in IoT applications in accordance with aspects of the present disclosure. The schematic diagram 200 illustrates an example of programmable logic controller (PLC) 205, and may include one or more UEs 104 that may be examples of sensors/actuators (SAs) discussed above. In some instances, the PLC 205 may be a gNB 102 or a UE 104 that is operating as a controller in IoT devices or other sidelink applications. When operating as a UE 104, the PLC 205 may include gNB functionalities that may include, for example, configuring search spaces and allocating resources to one or more SAs/UEs 104.

Thus, in some examples, there may be two modes of resource allocations. In first mode (Mode 1), the base station 102 may assign Tx resources for sidelink communications through downlink control information (DCI) messages. In the second mode (Mode 2), the transmitting UEs (Tx UE) may autonomously select resources for sidelink communication. Particularly, the Tx UE may perform channel sensing by blindly decoding all PSCCH channels and finding out the reserved resources by other sidelink transmissions. Tx may then report available resources to upper layer that selects resource usage for sidelink communication. In both instances, the Rx UE operation may be the same.

As noted above, in the IoT applications for instance, sidelink communications can be enabled between direct PLC 205 and a host of sensors/actuators (also referred hereto as UEs 104). In some examples, the UEs 104 operating as sensors/actuators may be reduced capability UEs 104 than traditional smart phones or may be configured with hardware specific for various applications (e.g., additional sensors etc.) A single PLC 205 may control 20-50 SAs or UEs 104 (e.g., first UE 104-*a*, second UE 104-*b*, and third UE 104-*c*). Because of the implementation of IoT applications, there may be tight latency (e.g., 1-2 milliseconds) and ultra-reliability requirements (e.g., $10^{-6}$ error rate) for communications between the PLC 204 and the plurality of SAs/UEs 104.

In some aspects, IoT traffic may be smaller packet size (e.g., 32-256 bytes) compared to other communications (e.g., cellular). Thus, the overall bandwidth requirement for IoT may be low (e.g., two resource blocks might be sufficient for many communications). Additionally, applications for sidelink communication in IoT application may have significant number of sub-channels (e.g., 50-100) in comparison to, for example, C-V2X applications. Thus, blind decoding all the sub-channels, as is conducted in conventional sidelink communications for applications such as C-V2X, may exceed UE capabilities and adversely impact the latency and reliability constraints.

To this end, aspects of the present disclosure may configure a search space for sidelink communications between a plurality of UEs 104. For purposes of the present disclosure, it should be appreciated that UE 104 may broadly encompass both the PLC 205 and the SAs that may be reduced or specially configured capability UEs 104 (e.g., configured with specific hardware such as sensors and actuators). Thus, the techniques described herein configure a search space (e.g., subset of all available sub-channels) to decode the sidelink packets (e.g., PSCCH) transmitted between a first UE 104 (that may be PLC 205 for example) and a second UE (that may be SA1/UE 104-*a*) over sidelink communication without the need for the receiver UE 104 (e.g., SA1/UE 104-*a*, *b*, *c*) to perform blind decoding of all sidelink sub-channels as is currently required in conventional systems.

In some examples, the search spaces may be configured for sidelink communication that are either UE-specific search space (USS) (e.g., for UE 104-*a*) or that are common search space (CSS) may be configured that are globally common to a plurality of sidelink UEs (e.g., UEs 104-*b* and *c*). Additionally or alternatively, the search spaces may also be configured that are transmitter UE dependent CSS ("Tx-dependent CSS") based on SL-Tx-UE-ID.

Figure 2B:
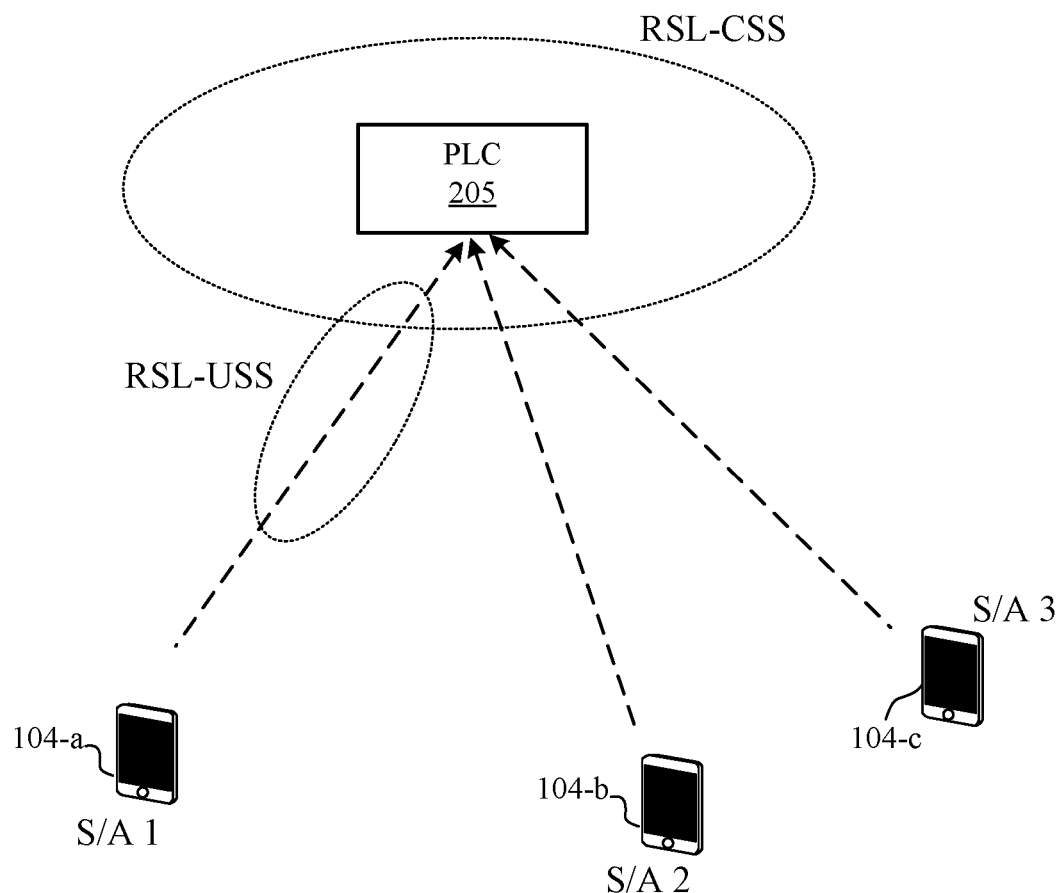
FIG. 2B is a schematic diagram of an example of a wireless communication system implementing reverse sidelink communication in IoT applications accordance with aspects of the present disclosure.

FIG. 2B is a schematic diagram 250 of an example of a wireless communication system implementing reverse sidelink communication in IoT applications in accordance with aspects of the present disclosure. The schematic diagram 250 illustrates an example of PLC 205, and may include one or more UEs 104 that may be examples of sensors/actuators (SAs) discussed above. As with the SAs, the PLCs that may receive reverse sidelink communications from a plurality of SAs (e.g., 50-60 SAs) that are associated with a single PLC, decoding all the subchannels for sidelink traffic from each of the SAs may be resource intensive for the PLC in terms of processing power.

Thus, in order to address this problem, aspects of the present disclosure also provide techniques for configuring a search space for reverse sidelink communications from the one or more SAs to the PLC in IoT applications. The techniques described herein configure a search space (e.g., subset of all available sub-channels) to decode the sidelink packets (e.g., PSCCH and/or PSSCH) transmitted between a first UE and a second UE over sidelink communication without the need for the receiver UE (e.g., second UE) to perform blind decoding of all sidelink sub-channels as is currently required in conventional systems. Thus, the disclosed techniques reduce latency and maximize the resource utilization (e.g., by using less processing power and bandwidth) for sidelink communications.

In some examples, the PLC may configure reverse sidelink common search space (RSL-CSS) for a plurality of SAs in order to indicate that the PLC is monitoring the RSL-CSS for all the SAs associated with the PLC. Therefore, in some aspects, the one or more SAs may transmit sidelink packets to the PLC over the RSL-CSS that is a subset of all available subchannels. In other examples, the PLC may configure reverse sidelink group CSS (RSL-Group-CSS) for a group of SAs of all the SAs associated with the PLC. In such instance, the PLC may indicate to the group of SAs that the PLC may monitor the RSL-Group-CSS for sidelink packets transmitted from the group of SAs.

Additionally or alternatively, the PLC may configure reverse sidelink user-specific search space (RSL-USS) to a specific SA that may be for a high priority traffic. In some instances, each SA may be allocated a priority level. To this end, the PLC may configure at least one SA from the plurality of SAs with RSL-USS for reverse sidelink communication, where the SA is allocated higher priority level than the priority levels of other SAs associated with the PLC. For example, a first SA (e.g., first UE) may be allocated a first priority level, a second SA (e.g., second UE) may be allocated a second priority level, and a third second SA (e.g., third UE) may be allocated a third priority level. A first, second, and third SAs may collectively be associated with the PLC.

Thus, as an example, the PLC may configure RSL-CSS for all three SAs (e.g., first, second, and third SAs), and separately configure a RSL-Group-CSS for a group of SAs such as second and third SAs. Finally, in some examples, the PLC may configure a RSL-USS for a first SA that is allocated a first priority level that is higher priority than the priority levels allocated to second and third SAs, respectively. In some aspects, the priority allocation may be based on either hardware-specific (e.g., specific to the hardware) or traffic-specific (e.g., dynamically switch to one of different SAs based on the priority of the traffic that may need to be transmitted from one of the SAs to the PLC).

In some examples, the RSL-USS may not indicate the resource grant or reservations for the SAs. Instead, either the base station may assign resources within the RSL-USS to the SA (e.g., Mode 1) or the high-priority SA may autonomously perform channel sensing and select resources within RSL-USS for transmission of sidelink packet (e.g., Mode 2). Alternatively, in some aspects, the RSL-USS resources may be reserved by base station or the PLC for the high-priority SA. In such instance, the SA would not need to wait for a channel grant (mode 1) or perform channel sensing (mode 2) to initiate a sidelink transmission to the PLC for high priority SAs. However, as noted above, majority of SAs may generally transmit in either RSL-CSS or RSL-Group-CSS in order to minimize bandwidth utilization.

In one or more examples, the base station may instruct the PLC of the reverse sidelink search space (RSL-SS) configuration based on resource pool usage by other PLCs in communication with the base station. Particularly, while the PLC may be associated with a plurality of SAs, a plurality of PLCs may be within a coverage area of a base station sharing resources. To this end, the base station may share the resource pool configuration information regarding the neighboring PLCs with one or more PLCs such that each PLC may configure RSL-SS accordingly. In other instances, each PLC may autonomously configure its own RSL-SS and inform of the configuration to the base station. The base station may thereafter determine whether any of the neighboring PLCs may have selected any conflicting resource pool configurations for RSL-SS, and therefore instruct the PLCs of remedial measures (e.g., messaging for alternative resource allocations).

Once the RSL-SS (e.g., RSL-CSS, RSL-Group-CSS, RSL-USS) are configured, the PLC notifies the plurality of SAs of the configuration. Thereafter, the PLC continues to monitor the channels associated with the configurations for sidelink packets transmitted by the SAs and decode any sidelink packets that may be transmitted by SAs. By limiting the number of channels that PLC may monitor to those configured for RSL-SS, the PLC may reduce latency and maximize the resource utilization (e.g., by using less processing power and bandwidth) for sidelink communications since the PLC does not need to perform blind decoding of all sidelink sub-channels.

In some examples, the PLC monitors the channels based on an order of the search space. Particularly, the PLC may monitor the bandwidth in the search space in the following order: (1) RSL-USS, (2) RSL-Group-CSS, (3) RSL-CSS, (4) search spaces of neighboring PLCs (e.g., data from other UEs outside the group associated with the PLC).

Additionally, as noted above, a search space is a location in resource blocks where the receiver UE may search for PSCCH and/or PSSCH (e.g., data packet). The CCE indices in a given configurable control resource set (CORESET) for the PSCCH may be calculated based on a hashing functions. Thus, in some instances, one or more parameters for the hashing function for allocation of search space subchannels for RSL-USS, RSL-Group-CSS, RSL-CSS may be a function of one or more of PLC identification (ID), SA ID, or slot index.

In some instances, in order to maintain channel diversity and minimize interference, the parameters used in the hashing function for search space subchannel selection for forward sidelink communication may be different than the parameters that may be used for the hashing function for search space subchannel selection for reverse sidelink communication. For example, while the forward sidelink communication may configure a search space that is based on a hashing function that is a function of PLC ID, the reverse sidelink communication may be configure the search space that is based on the hashing function that is a function of SA ID. Thus, while the same hashing function (e.g., equation 1) may be implemented for determining the CCE indices for both the forward sidelink communication and the reverse sidelink communication, two different results may be output given the different parameters used for hashing function. In other examples, the selected ID may also be modified in at least one direction (e.g., by a random number) in order to obtain channel diversity between forward and reverse sidelink communication. Additionally or alternatively, the search spaces may be configured by using different hashing functions altogether between the forward sidelink and reverse sidelink communication.

The search spaces for PSCCH sidelink communication may also be designed in a number of different ways. Indeed, in one example, the configured search spaces may occupy contiguous subchannels with different offset and length from a reference point. In another example, the search spaces may uniformly select PSCCH locations with a random seed (e.g., NR PSDCH) with a number of subchannels that are indicated. In yet another example, PSCCH location may be randomly selected with a random seed with a number of channels indicated. In each of the three examples, the maximum PSSCH allocation size may be smaller than the total number of subchannels.

Figure 3:
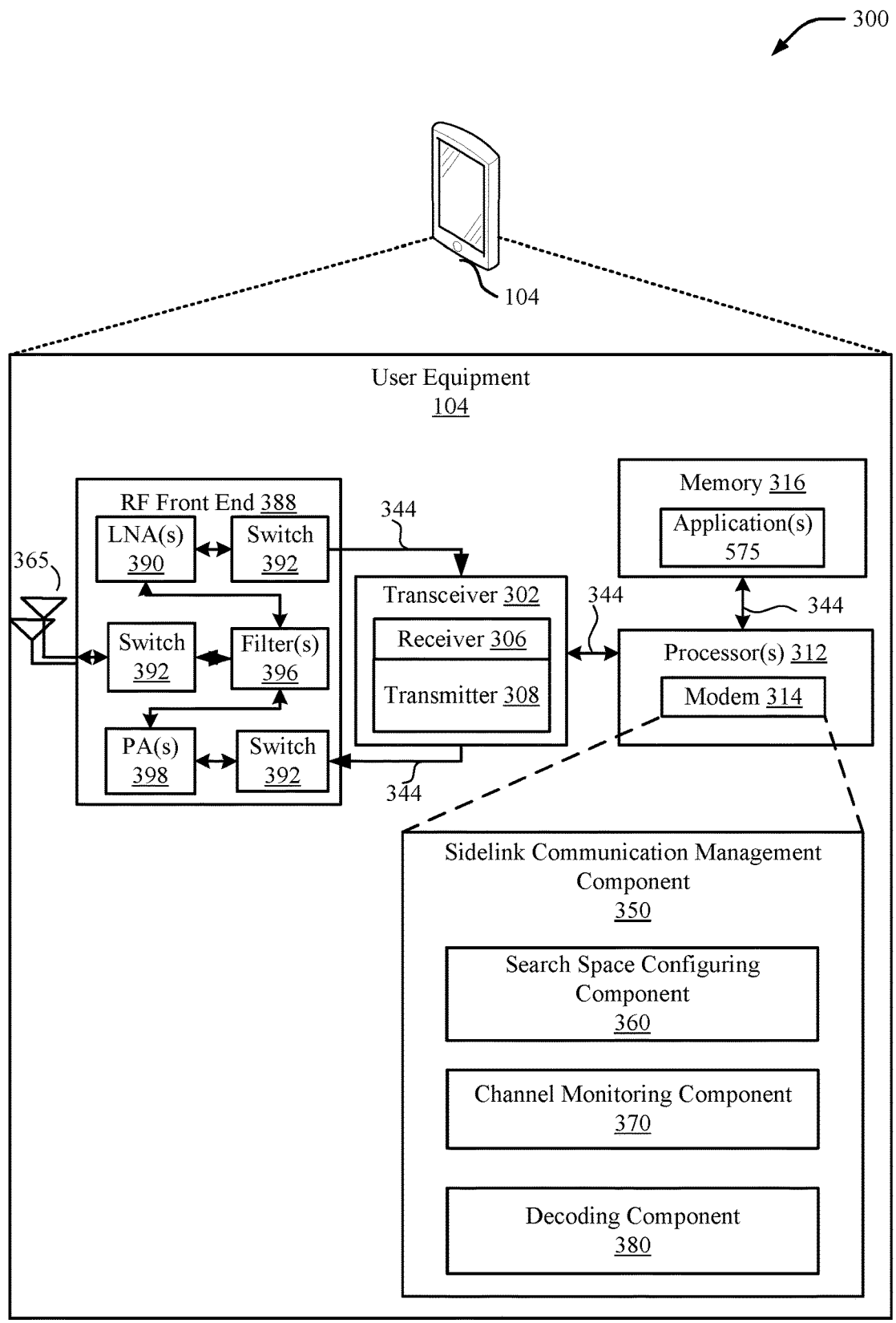
FIG. 3 is a schematic diagram of an example implementation of various components of a user equipment in accordance with various aspects of the present disclosure.

FIG. 3 illustrates hardware components and subcomponents of a device that may be a UE 104 for implementing one or more methods (e.g., method 400 and 500) described herein in accordance with various aspects of the present disclosure. For example, one example of an implementation of the UE 104 may include a variety of components, some of which have already been described above, but including components such as one or more processors 312, memory 316 and transceiver 302 in communication via one or more buses 344, which may operate in conjunction with the sidelink communication management component 350 to perform functions described herein related to including one or more methods (e.g., 400 and 500) of the present disclosure.

In some aspects, the sidelink communication management component 350 may configure and monitor a search space for sidelink communications between a plurality of UEs. Particularly, the sidelink communication management component 350 configures a search space (e.g., subset of all available sub-channels) to decode the sidelink packets (e.g., physical sidelink control channel (PSCCH) and physical sidelink shared channel (PSSCH)) transmitted between a first UE and a second UE over sidelink communication without the need for the receiver UE (e.g., PLC) to perform blind decoding of all sidelink sub-channels as is currently required in conventional systems for reverse sidelink communications.

In some aspects, the sidelink communication management component 350, when operating as a PLC, may configure a search space (e.g., subset of all available sub-channels) for reverse sidelink communications from one or more SAs to PLC in IoT applications in order to minimize decoding the number of channels that the UE 104 (e.g., PLC) may need to decode to receive sidelink traffic from another UE 104 (e.g., one or more SAs). In some aspects, the sidelink communication management component 350 may configure, via the search space configuring component 360, the sidelink bandwidth as one of RSL-CSS, RSL-Group-CSS, or RSL-USS that indicates to one or more SAs (e.g., second UEs 104) that the PLC (e.g., first UE 104) is monitoring the specified subchannels for sidelink traffic from the one more SAs associated with the PLC.

The sidelink communication management component 350 may also include a channel monitoring component 370 that monitors the subset of subchannels that are configured for reverse sidelink communications from one or more SAs to the PLCs. Any sidelink packets received on the monitored subchannels may be decoded by the decoding component 380 of the UE 104.

Thus, in some examples, the search space configuring component 360 may configure RSL-CSS for a plurality of SAs in order to indicate that the PLC is monitoring the RSL-CSS for all the SAs associated with the PLC. Therefore, in some aspects, the one or more SAs may transmit sidelink packets to the PLC over the RSL-CSS that is a subset of all available subchannels. In other examples, the search space configuring component 360 may configure RSL-Group-CSS for a group of SAs of all the SAs associated with the PLC. In such instance, the UE 104 may indicate to the group of SAs (e.g., second UEs 104) that the channel monitoring component 370 of the UE 104 may monitor the RSL-Group-CSS for sidelink packets transmitted from the group of SAs. Additionally or alternatively, the search space configuring component 360 may configure RSL-USS to a specific SA that may be for a high priority traffic.

In other examples, the UE 104, when operating as one of the SAs associated with the PLC may configure the sidelink communication management component 350 to receive the search space configuration information from the PLC UE. The UE 104 may accordingly transmit in the reverse sidelink direction to the PLC sidelink traffic over the allocated subchannels based on the configuration information.

The one or more processors 312, modem 314, memory 316, transceiver 302, RF front end 388 and one or more antennas 365, may be configured to support voice and/or data calls (simultaneously or non-simultaneously) in one or more radio access technologies. In an aspect, the one or more processors 312 can include a modem 314 that uses one or more modem processors. The various functions related to sidelink communication management component 350 may be included in modem 314 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 314 associated with sidelink communication management component 350 may be performed by transceiver 302.

The memory 316 may be configured to store data used herein and/or local versions of application(s) 375 or sidelink communication management component 350 and/or one or more of its subcomponents being executed by at least one processor 312. The memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining sidelink communication management component 350 and/or one or more of its subcomponents, and/or data associated therewith, when the UE 104 is operating at least one processor 312 to execute sidelink communication management component 350 and/or one or more of its subcomponents.

The transceiver 302 may include at least one receiver 306 and at least one transmitter 308. The receiver 306 may include hardware, firmware, and/or software code executable by a processor for receiving data, the code comprising instructions and being stored in a memory (e.g., computer-readable medium). The receiver 306 may be, for example, a radio frequency (RF) receiver. In an aspect, the receiver 306 may receive signals transmitted by at least one UE 104. Additionally, receiver 306 may process such received signals, and also may obtain measurements of the signals, such as, but not limited to, Ec/Io, SNR, RSRP, RSSI, etc. The transmitter 308 may include hardware, firmware, and/or software code executable by a processor for transmitting data, the code comprising instructions and being stored in a memory (e.g., computer-readable medium). A suitable example of the transmitter 308 may including, but is not limited to, an RF transmitter.

Moreover, in an aspect, transmitting device may include the RF front end 388, which may operate in communication with one or more antennas 365 and transceiver 302 for receiving and transmitting radio transmissions, for example, wireless communications transmitted by at least one base station 102 or wireless transmissions transmitted by UE 104. The RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, the LNA 390 can amplify a received signal at a desired output level. In an aspect, each LNA 390 may have a specified minimum and maximum gain values. In an aspect, the RF front end 388 may use one or more switches 392 to select a particular LNA 390 and its specified gain value based on a desired gain value for a particular application.

Further, for example, one or more PA(s) 398 may be used by the RF front end 388 to amplify a signal for an RF output at a desired output power level. In an aspect, each PA 398 may have specified minimum and maximum gain values. In an aspect, the RF front end 388 may use one or more switches 392 to select a particular PA 398 and its specified gain value based on a desired gain value for a particular application.

Also, for example, one or more filters 396 can be used by the RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, the RF front end 388 can use one or more switches 392 to select a transmit or receive path using a specified filter 396, LNA 390, and/or PA 398, based on a configuration as specified by the transceiver 302 and/or processor 312.

As such, the transceiver 302 may be configured to transmit and receive wireless signals through one or more antennas 365 via the RF front end 588. In an aspect, the transceiver 302 may be tuned to operate at specified frequencies such that transmitting device can communicate with, for example, one or more base stations 102 or one or more cells associated with one or more base stations 102 or other UEs 104. In an aspect, for example, the modem 314 can configure the transceiver 502 to operate at a specified frequency and power level based on the configuration of the transmitting device and the communication protocol used by the modem 314.

In an aspect, the modem 314 can be a multiband-multimode modem, which can process digital data and communicate with the transceiver 302 such that the digital data is sent and received using the transceiver 302. In an aspect, the modem 314 can be multiband and be configured to support multiple frequency bands for a specific communications protocol. In an aspect, the modem 314 can be multimode and be configured to support multiple operating networks and communications protocols. In an aspect, the modem 314 can control one or more components of transmitting device (e.g., RF front end 388, transceiver 302) to enable transmission and/or reception of signals from the network based on a specified modem configuration. In an aspect, the modem configuration can be based on the mode of the modem 314 and the frequency band in use. In another aspect, the modem configuration can be based on UE configuration information associated with transmitting device as provided by the network during cell selection and/or cell reselection.

Figure 4:
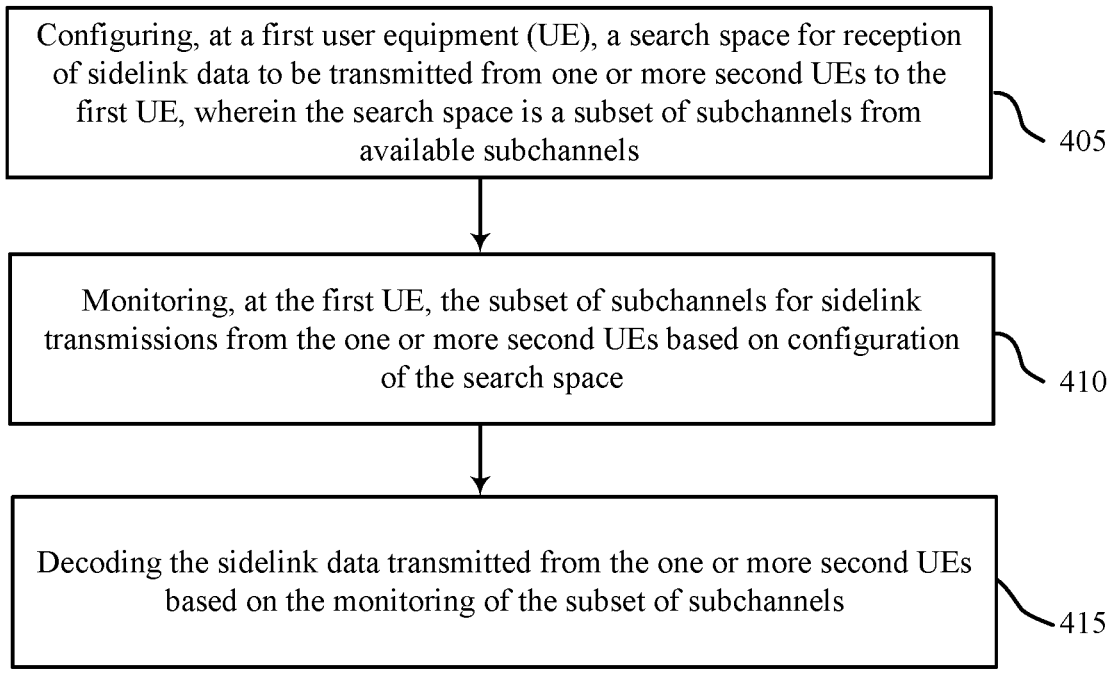
FIG. 4 is a flow diagram of an example of a method of wireless communication implemented by the UE such as a PLC in accordance with aspects of the present disclosure.

Referring to FIG. 4, an example method 400 for wireless communications in accordance with aspects of the present disclosure may be performed by one or more UEs 104 (e.g., PLC) discussed with reference to FIGS. 1, 2A and 2B. Although the method 400 is described below with respect to the elements of the UE 104, other components may be used to implement one or more of the steps described herein.

At block 405, the method 400 may include configuring, at a first UE, a search space for reception of sidelink data to be transmitted from one or more second UEs to the first UE. In some examples, the search space may be a subset of subchannels from available subchannels. In some aspects, configuring the search space for reception of the sidelink data to be transmitted from the one or more second UEs may comprise configuring one of a reverse sidelink common search space (RSL-CSS), reverse sidelink group common search space (RSL-Group-CSS), or a reverse sidelink UE-specific search space (RSL-USS) for the sidelink transmissions from the one or more second UEs. Particularly, configuring a reverse sidelink common search space (RSL-CSS) may indicate to the one or more second UEs that the first UE is monitoring the RSL-CSS for the sidelink transmissions from each of the one or more second UEs. Additionally or alternatively, configuring a reverse sidelink group common search space (RSL-Group-CSS) may indicate to the one or more second UEs that the first UE is monitoring the RSL-Group-CSS for the sidelink transmissions from a subset of the one or more second UEs.

Additionally, configuring the search space for reception of the sidelink data may include configuring a reverse sidelink UE-specific search space (RSL-USS) for a second UE of the one or more second UEs. In some examples, the second UE (e.g., high-priority UE) may be allocated a priority level for high priority sidelink traffic transmissions that is higher than the priority levels allocated for remaining of the one or more second UEs.

Thus, configuring the RSL-USS for the second UE, may comprise receiving, at the first UE, a reverse sidelink configuration information from a base station, wherein the reverse sidelink configuration information includes resource allocation within the RSL-USS for the second UE. In other examples, configuring the RSL-USS for the second UE, may comprise instructing the second UE to omit performing channel sensing and resource selection within the RSL-USS prior to transmitting the sidelink data to the first UE. Additionally, configuring the RSL-USS for the high priority UE may comprise reserving resources within the RSL-USS for the second UE by one or both of the first UE or a base station.

In some examples, configuring the search space for reception of the sidelink data to be transmitted from the one or more second UEs may comprise receiving, at the first UE, a reverse sidelink configuration information from a base station, wherein the base station indicates the search space that the first UE should configure for reception of the sidelink data based on resource pool usage. In some examples, configuring the search space for reception of the sidelink data to be transmitted from the one or more second UEs may comprise transmitting a reverse sidelink configuration information from the first UE to a base station, wherein the reverse sidelink configuration information identifies to the base station the search space that the first UE has configured for reception of the sidelink data from the one or more second UEs.

Additionally, configuring the search space for reception of the sidelink data to be transmitted from the one or more second UEs further may comprise transmitting, from the one or more second UEs to a base station, a search space reverse sidelink configuration information. In some examples, the search space may be configured based on a hashing function that is calculated using one or more parameters, wherein the one or more parameters include a first UE's identification ("SL-Rx-UE ID"), a second UE's identification ("SL-Tx-UE ID"), or a link identification between the first UE and the second UE ("SL-Tx-Rx-Link ID").

Additionally, in some aspects, the search space for the reception of the sidelink data may be based on a first hashing function using one or more parameters, and a forward link search space for transmission of the sidelink data may be based on a second hashing function using the one or more parameters. Aspects of block 405 may be performed by the sidelink communication management component 305, and more particularly the search space configuring component 360 as described with reference to FIG. 3. Thus, sidelink communication management component 350, the search space configuring component 360, modem 314, processor 312, and/or the UE 104 or one of its subcomponents may define the means for configuring, at a first UE, a search space for reception of sidelink data to be transmitted from one or more second UEs to the first UE.

At block 410, the method 400 may include monitoring, at the first UE, the subset of subchannels for sidelink transmissions from the one or more second UEs based on configuration of the search space. In some examples, monitoring the subset of subchannels for the sidelink transmissions based on configuration of the search space may comprise prioritizing the monitoring of the subset of subchannels based on the search space configuration, wherein the search space configuration includes one or more of a reverse sidelink UE-specific search space (RSL-USS), a reverse sidelink group common search space (RSL-Group-CSS), a reverse sidelink common search space (RSL-CSS).

Aspects of block 410 may be performed by channel monitoring component 370 described with reference to FIG. 3 in conjunction with the transceiver 302. Particularly, the one or more antennas 365 of the UE 104 may detect signals received at the UE 104 over one or more channels. The signals may be filtered via the RF front end 388 and processed by the transceiver 302. However, in order to minimize allocating resources for processing signals that may be received on channels or subchannels that are not configured for sidelink communications, the UE 104 may omit any such signals. Thus, the channel monitoring component 370 may monitor only a subset of subchannels that are configured and indicated to the one or more SAs for sidelink communications. Any signals that may be received on the monitored channels may then be forwarded to the decoding component 380. Thus, sidelink communication management component 350, the channel monitoring component 370, transceiver 302, one or more antennas 365, processor 312, and/or the UE 104 or one of its subcomponents may define the means for monitoring, at the first UE, the subset of subchannels for sidelink transmissions from the one or more second UEs based on configuration of the search space.

At block 415, the method 400 may include decoding the sidelink data transmitted from the one or more second UEs based on the monitoring of the subset of subchannels. Aspects of block 415 may be performed by the decoding component 380. As discussed above, the channel monitoring component 370 may detect signals on subset of subchannels during the monitoring period and forward any detected signals to the decoding component 380 in order to decode the received sidelink data. Thus, sidelink communication management component 350, the decoding component 380, transceiver 302, processor 312, and/or the UE 104 or one of its subcomponents may define the means for decoding the sidelink data transmitted from the one or more second UEs based on the monitoring of the subset of subchannels.

Figure 5:
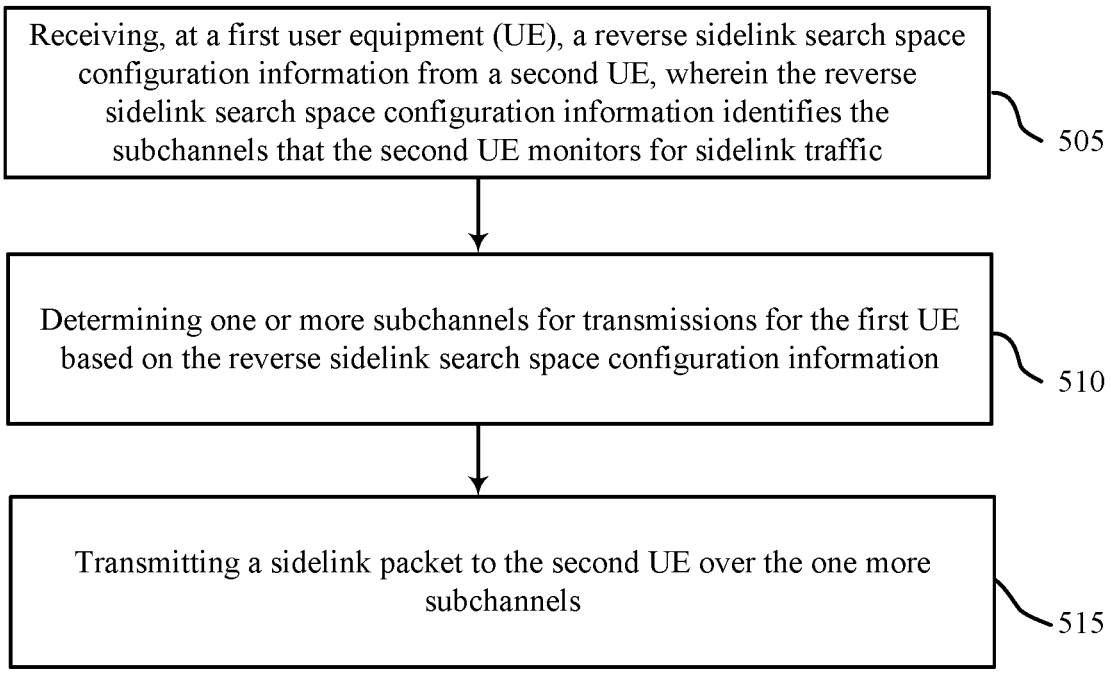
FIG. 5 is a flow diagram of an example of a method of wireless communication implemented by the UE such as an SA in accordance with aspects of the present disclosure.

Referring to FIG. 5, an example method 500 for wireless communications in accordance with aspects of the present disclosure may be performed by one or more UEs 104 (e.g., SA) discussed with reference to FIGS. 1, 2A and 2B. Although the method 500 is described below with respect to the elements of the UE 104, other components may be used to implement one or more of the steps described herein.

At block 505, the method 500 may include receiving, at a first UE, a reverse sidelink search space configuration information from a second UE, wherein the reverse sidelink search space configuration information identifies the subchannels that the second UE monitors for sidelink traffic. Aspects of block 505 may be performed by one or more antennas 365 receiving signals over a wireless channels and filtering the signals via the RF front end 388 before forwarding the signals to the transceiver 302. The received signals are then processed by the modem 314, and in part by the sidelink communication management component 350 when the UE 104 is operating as an SA as described with reference to FIGS. 1, 2A and 2B. Once the reverse sidelink search space configuration information is received and decoded by the decoding component 380, the information may be stored in the memory 316 of the UE 104. Thus, one or more antennas 365, transceiver 302, sidelink communication management component 350, the decoding component 380, processor 312, modem 314, memory 316, and/or the UE 104 or one of its subcomponents may define the means for receiving, at a first UE, a reverse sidelink search space configuration information from a second UE.

In some aspects, the reverse sidelink search space configuration information may comprise one of a reverse sidelink common search space (RSL-CSS), reverse sidelink group common search space (RSL-Group-CSS), or a reverse sidelink UE-specific search space (RSL-USS) for the sidelink transmissions from the first UE to the second UE. The RSL-CSS may indicate to the first UE that the second UE is monitoring the RSL-CSS for the sidelink transmissions from a plurality of UEs. The RSL-Group-CSS may indicate to the first UE that the second UE is monitoring the RSL-Group-CSS for the sidelink transmissions from a subset of UEs associated with the second UE. The RSL-USS for the first UE may indicate that the second UE has allocated a high priority to the first UE for sidelink traffic transmissions than the priority levels allocated for one or more third UEs associated with the second UE.

At block 510, the method may 500 may include determining one or more subchannels for transmissions for the first UE based on the reverse sidelink search space configuration information. Aspects of block 510 may also be performed by the sidelink communication management component 350 discussed with reference to FIG. 3. Thus, sidelink communication management component 350, processor 312, modem 314, and/or the UE 104 or one of its subcomponents may define the means for determining one or more subchannels for transmissions for the first UE based on the reverse sidelink search space configuration information.

At block 515, the method 500 may include transmitting a sidelink packet to the second UE over the one more subchannels. In some examples, transmitting the sidelink packet to the second UE over the one more subchannels, may comprise transmitting the sidelink packet without performing channel sensing and resource selection within the RSL-USS prior to transmitting the sidelink packet to the second UE. Aspects of block 515 may be performed by the sidelink communication management component 350 generating a packet for transmission to the second UE (e.g., PLC) that is forwarded to the transceiver 302 to converted for transmission over a wireless channel. The sidelink packet may be transmitted over the one or more subchannels over the one or more antennas 365 to the second UE (e.g., PLC) from the first UE (e.g., SA). Thus, one or more antennas 365, transceiver 302, sidelink communication management component 350, the decoding component 380, processor 312, modem 314, memory 316, and/or the UE 104 or one of its subcomponents may define the means for transmitting a sidelink packet to the second UE over the one more subchannels.

Some Further Example Clauses

Implementation examples are described in the following numbered clauses:

1. A method for wireless communications, comprising:
    configuring, at a first user equipment (UE), a search space for reception of sidelink data to be transmitted from one or more second UEs to the first UE, wherein the search space is a subset of subchannels from available subchannels;
    monitoring, at the first UE, the subset of subchannels for sidelink transmissions from the one or more second UEs based on configuration of the search space; and
    decoding the sidelink data transmitted from the one or more second UEs based on the monitoring of the subset of subchannels.
2. The method of clause 1, wherein the search space comprises one of a reverse sidelink common search space (RSL-CSS), reverse sidelink group common search space (RSL-Group-CSS), or a reverse sidelink UE-specific search space (RSL-USS) for the sidelink transmissions from the one or more second UEs.
3. The method of any preceding clause, wherein configuring the search space for reception of the sidelink data to be transmitted from the one or more second UEs comprises:
    configuring a reverse sidelink common search space (RSL-CSS) to indicate to the one or more second UEs that the first UE is monitoring the RSL-CSS for the sidelink transmissions from each of the one or more second UEs.
4. The method of any preceding clause, wherein configuring the search space for reception of the sidelink data to be transmitted from the one or more second UEs comprises:
    configuring a reverse sidelink group common search space (RSL-Group-CSS) to indicate to the one or more second UEs that the first UE is monitoring the RSL-Group-CSS for the sidelink transmissions from a subset of the one or more second UEs.
5. The method of any preceding clause, wherein configuring the search space for reception of the sidelink data to be transmitted from the one or more second UEs comprises:
    configuring a reverse sidelink UE-specific search space (RSL-USS) for a second UE of the one or more second UEs, wherein the second UE is allocated a priority level for high priority sidelink traffic transmissions that is higher than the priority levels allocated for remaining of the one or more second UEs.
6. The method of any preceding clause, wherein configuring the RSL-USS for the second UE, comprises:
    receiving, at the first UE, a reverse sidelink configuration information from a base station, wherein the reverse sidelink configuration information includes resource allocation within the RSL-USS for the second UE.
7. The method of any preceding clause, wherein configuring the RSL-USS for the second UE, comprises:
    instructing the second UE to omit performing channel sensing and resource selection within the RSL-USS prior to transmitting the sidelink data to the first UE.
8. The method of any preceding clause, wherein configuring the RSL-USS for the second UE, comprises:
    reserving resources within the RSL-USS for the second UE by one or both of the first UE or a base station.
9. The method of any preceding clause, wherein configuring the search space for reception of the sidelink data to be transmitted from the one or more second UEs comprises:
    receiving, at the first UE, a reverse sidelink configuration information from a base station, wherein the base station indicates the search space that the first UE should configure for reception of the sidelink data based on resource pool usage.
10. The method of any preceding clause, wherein configuring the search space for reception of the sidelink data to be transmitted from the one or more second UEs comprises:
    transmitting a reverse sidelink configuration information from the first UE to a base station, wherein the reverse sidelink configuration information identifies to the base station the search space that the first UE has configured for reception of the sidelink data from the one or more second UEs.
11. The method of any preceding clause, wherein monitoring the subset of subchannels for the sidelink transmissions based on configuration of the search space comprises:
    prioritizing the monitoring of the subset of subchannels based on the search space configuration, wherein the search space configuration includes one or more of a reverse sidelink UE-specific search space (RSL-USS), a reverse sidelink group common search space (RSL-Group-CSS), a reverse sidelink common search space (RSL-CSS).
12. The method of any preceding clause, wherein the search space is configured based on a hashing function that is calculated using one or more parameters, wherein the one or more parameters include a first UE's identification ("SL-Rx-UE ID"), a second UE's identification ("SL-Tx-UE ID"), or a link identification between the first UE and the second UE ("SL-Tx-Rx-Link ID").
13. The method of any preceding clause, wherein the search space for the reception of the sidelink data is based on a first hashing function using one or more parameters, and
    wherein a forward link search space for transmission of the sidelink data is based on a second hashing function using the one or more parameters.
14. The method of any preceding clause, wherein the search space for the reception of the sidelink data is based on a first hashing function using a first parameter, and wherein a forward link search space for transmission of the sidelink data is based on the first hashing function using the first parameter that is modified.

15. An apparatus for wireless communications, comprising:
   at least one processor;
   and memory coupled to the at least one processor, the memory including instructions executable by the at least one processor to cause the apparatus to:
      configure, at a first user equipment (UE), a search space for reception of sidelink data to be transmitted from one or more second UEs to the first UE, wherein the search space is a subset of subchannels from available subchannels;
      monitor, at the first UE, the subset of subchannels for sidelink transmissions from the one or more second UEs based on configuration of the search space; and
      decode the sidelink data transmitted from the one or more second UEs based on the monitoring of the subset of subchannels.

16. The apparatus of clause 15, wherein the search space comprises one of a reverse sidelink common search space (RSL-CSS), reverse sidelink group common search space (RSL-Group-CSS), or a reverse sidelink UE-specific search space (RSL-USS) for the sidelink transmissions from the one or more second UEs.

17. The apparatus of any preceding clause, wherein the instructions to configure the search space for reception of the sidelink data to be transmitted from the one or more second UEs are further executable by the processor to:
   configure a reverse sidelink common search space (RSL-CSS) to indicate to the one or more second UEs that the first UE is monitoring the RSL-CSS for the sidelink transmissions from each of the one or more second UEs.

18. The apparatus of any preceding clause, wherein the instructions to configure the search space for reception of the sidelink data to be transmitted from the one or more second UEs are further executable by the processor to:
   configure a reverse sidelink group common search space (RSL-Group-CSS) to indicate to the one or more second UEs that the first UE is monitoring the RSL-Group-CSS for the sidelink transmissions from a subset of the one or more second UEs.

19. The apparatus of any preceding clause, wherein the instructions to configure the search space for reception of the sidelink data to be transmitted from the one or more second UEs are further executable by the processor to:
   configure a reverse sidelink UE-specific search space (RSL-USS) for a second UE of the one or more second UEs, wherein the second UE is allocated a priority level for high priority sidelink traffic transmissions that is higher than the priority levels allocated for remaining of the one or more second UEs.

20. The apparatus of any preceding clause, wherein the instructions to configure the search space for reception of the sidelink data to be transmitted from the one or more second UEs are further executable by the processor to:
   receive, at the first UE, a reverse sidelink configuration information from a base station, wherein the base station indicates the search space that the first UE should configure for reception of the sidelink data based on resource pool usage.

21. A method for wireless communication, comprising:
   receiving, at a first user equipment (UE), a reverse sidelink search space configuration information from a second UE, wherein the reverse sidelink search space configuration information identifies the subchannels that the second UE monitors for sidelink traffic;
   determining one or more subchannels for transmissions for the first UE based on the reverse sidelink search space configuration information; and
   transmitting a sidelink packet to the second UE over the one more subchannels.

22. The method of clause 21, wherein the reverse sidelink search space configuration information comprises one of a reverse sidelink common search space (RSL-CSS), reverse sidelink group common search space (RSL-Group-CSS), or a reverse sidelink UE-specific search space (RSL-USS) for the sidelink transmissions from the first UE to the second UE.

23. The method of any preceding clause, wherein the RSL-CSS indicates to the first UE that the second UE is monitoring the RSL-CSS for the sidelink transmissions from a plurality of UEs.

24. The method of any preceding clause, wherein the RSL-Group-CSS indicates to the first UE that the second UE is monitoring the RSL-Group-CSS for the sidelink transmissions from a subset of UEs associated with the second UE.

25. The method of any preceding clause, wherein the RSL-USS for the first UE indicates that the second UE has allocated a high priority to the first UE for sidelink traffic transmissions than the priority levels allocated for one or more third UEs associated with the second UE.

26. The method of any preceding clause, wherein transmitting the sidelink packet to the second UE over the one more subchannels, comprises:
   transmitting the sidelink packet without performing channel sensing and resource selection within the RSL-USS prior to transmitting the sidelink packet to the second UE.

27. An apparatus for wireless communications, comprising:
   at least one processor;
   and memory coupled to the at least one processor, the memory including instructions executable by the at least one processor to cause the apparatus to:
      receive, at a first user equipment (UE), a reverse sidelink search space configuration information from a second UE, wherein the reverse sidelink search space configuration information identifies the subchannels that the second UE monitors for sidelink traffic;
      determine one or more subchannels for transmissions for the first UE based on the reverse sidelink search space configuration information; and
      transmit a sidelink packet to the second UE over the one more subchannels.

28. The apparatus of clause 27, wherein the reverse sidelink search space configuration information comprises one of a reverse sidelink common search space (RSL-CSS), reverse sidelink group common search space (RSL-Group-CSS), or a reverse sidelink UE-specific search space (RSL-USS) for the sidelink transmissions from the first UE to the second UE.

29. The apparatus of any preceding clause, wherein the RSL-CSS indicates to the first UE that the second UE is monitoring the RSL-CSS for the sidelink transmissions from a plurality of UEs.

30. The apparatus of any preceding clause, wherein the RSL-Group-CSS indicates to the first UE that the second UE is monitoring the RSL-Group-CSS for the sidelink transmissions from a subset of UEs associated with the second UE.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The detailed description set forth above in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems are also presented with reference to various apparatus and methods. These apparatus and methods are described in the detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout the disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising: configuring, at a first user equipment (UE), a search space for reception of sidelink data to be transmitted from one or more second UEs to the first UE, wherein the search space is a subset of subchannels from available subchannels, wherein the search space comprises one of a reverse sidelink common search space (RSL-CSS), reverse sidelink group common search space (RSL-Group-CSS), or a reverse sidelink UE-specific search space (RSL-USS) for the sidelink transmissions from the one or more second UEs; configuring the RSL-USS for a second UE of the one or more second UEs, wherein the second UE is allocated a priority level for high priority sidelink traffic transmissions that is higher than the priority levels allocated for remaining of the one or more second UEs; instructing the second UE to omit performing channel sensing and resource selection within the RSL-USS prior to transmitting the sidelink data to the first UE: monitoring, at the first UE, the subset of subchannels for sidelink transmissions from the one or more second UEs based on configuration of the search space; and decoding the sidelink data transmitted from the one or more second UEs based on the monitoring of the subset of subchannels.

2. The method of claim 1, wherein configuring the RSL-USS for the second UE, comprises: receiving, at the first UE, a reverse sidelink configuration information from a base station, wherein the reverse sidelink configuration information includes resource allocation within the RSL-USS for the second UE.

3. The method of claim 1, wherein configuring the RSL-USS for the second UE, comprises: reserving resources within the RSL-USS for the second UE by one or both of the first UE or a base station.

4. The method of claim 1, wherein configuring the search space for reception of the sidelink data to be transmitted from the one or more second UEs comprises: receiving, at the first UE, a reverse sidelink configuration information from a base station, wherein the base station indicates the search space that the first UE should configure for reception of the sidelink data based on resource pool usage.

5. The method of claim 1, wherein configuring the search space for reception of the sidelink data to be transmitted from the one or more second UEs comprises: transmitting a reverse sidelink configuration information from the first UE to a base station, wherein the reverse sidelink configuration information identifies to the base station the search space that the first UE has configured for reception of the sidelink data from the one or more second UEs.

6. The method of claim 1, wherein monitoring the subset of subchannels for the sidelink transmissions based on configuration of the search space comprises: prioritizing the monitoring of the subset of subchannels based on the search space configuration.

7. The method of claim 1, wherein the search space is configured based on a hashing function that is calculated using one or more parameters, wherein the one or more parameters include a first UE's identification ("SL-Rx-UE ID"), a second UE's identification ("SL-Tx-UE ID"), or a link identification between the first UE and the second UE ("SL-Tx-Rx-Link ID").

8. The method of claim 1, wherein the search space for the reception of the sidelink data is based on a first hashing function using one or more parameters, and wherein a forward link search space for transmission of the sidelink data is based on a second hashing function using the one or more parameters.

9. The method of claim 1, wherein the search space for the reception of the sidelink data is based on a first hashing function using a first parameter, and wherein a forward link search space for transmission of the sidelink data is based on the first hashing function using the first parameter that is modified.

10. An apparatus for wireless communications, comprising: at least one processor; and memory coupled to the at least one processor, the memory including instructions executable by the at least one processor to cause the apparatus to: configure, at a first user equipment (UE), a search space for reception of sidelink data to be transmitted from one or more second UEs to the first UE, wherein the search space is a subset of subchannels from available subchannels, wherein the search space comprises one of a reverse sidelink common search space (RSL-CSS), reverse sidelink group common search space (RSL-Group-CSS), or a reverse sidelink UE-specific search space (RSL-USS) for the sidelink transmissions from the one or more second UEs; configure the RSL-USS for a second UE of the one or more second UEs, wherein the second UE is allocated a priority level for high priority sidelink traffic transmissions that is higher than the priority levels allocated for remaining of the one or more second UEs; instruct the second UE to omit performing channel sensing and resource selection within the RSL-USS prior to transmitting the sidelink data to the first UE: monitor, at the first UE, the subset of subchannels for sidelink transmissions from the one or more second UEs based on configuration of the search space; and decode the sidelink data transmitted from the one or more second UEs based on the monitoring of the subset of subchannels.

11. The apparatus of claim 10, wherein the instructions to configure the search space for reception of the sidelink data to be transmitted from the one or more second UEs are further executable by the processor to: receive, at the first UE, a reverse sidelink configuration information from a base station, wherein the base station indicates the search space that the first UE should configure for reception of the sidelink data based on resource pool usage.

12. A method for wireless communication, comprising: receiving, at a first user equipment (UE), a reverse sidelink search space configuration information from a second UE, wherein the reverse sidelink search space configuration information identifies the subchannels that the second UE monitors for sidelink traffic, wherein the reverse sidelink search space configuration information comprises one of a reverse sidelink common search space (RSL-CSS), reverse sidelink group common search space (RSL-Group-CSS), or a reverse sidelink UE-specific search space (RSL-USS) for the sidelink transmissions from the first UE to the second UE, wherein the first UE is allocated a priority level for high priority sidelink traffic transmissions that is higher than the priority levels allocated for a plurality of UEs; receiving an indication to omit performing channel sensing and resource selection within the RSL-USS prior to transmitting the sidelink data to the second UE: determining one or more subchannels for transmissions for the first UE based on the reverse sidelink search space configuration information; and transmitting a sidelink packet to the second UE over the one more subchannels.

13. The method of claim 12, wherein the RSL-USS for the first UE indicates that the second UE has allocated a high priority to the first UE for sidelink traffic transmissions than the priority levels allocated for one or more third UEs associated with the second UE.

14. The method of claim 12, wherein transmitting the sidelink packet to the second UE over the one more subchannels, comprises: transmitting the sidelink packet without performing channel sensing and resource selection within the RSL-USS prior to transmitting the sidelink packet to the second UE.

15. An apparatus for wireless communications, comprising: at least one processor; and memory coupled to the at least one processor, the memory including instructions executable by the at least one processor to cause the apparatus to: receive, at a first user equipment (UE), a reverse sidelink search space configuration information from a second UE, wherein the reverse sidelink search space configuration information identifies the subchannels that the second UE monitors for sidelink traffic, wherein the reverse sidelink search space configuration information comprises one of a reverse sidelink common search space (RSL-CSS), reverse sidelink group common search space (RSL-Group-CSS), or a reverse sidelink UE-specific search space (RSL-USS) for the sidelink transmissions from the first IE to the second IE, wherein the first IE is allocated a priority level for high priority sidelink traffic transmissions that is higher than the priority levels allocated for a plurality of UEs; receive an indication to omit performing channel sensing and resource selection within the RSL-USS prior to transmitting the sidelink data to the second UE: determine one or more subchannels for transmissions for the first UE based on the reverse sidelink search space configuration information; and transmit a sidelink packet to the second UE over the one more subchannels.

16. The apparatus of claim 15, wherein the RSL-USS for the first UE indicates that the second UE has allocated a high priority to the first UE for sidelink traffic transmissions than the priority levels allocated for one or more third UEs associated with the second UE.

17. The apparatus of claim 15, wherein the instructions to transmit the sidelink packet to the second UE over the one more subchannels, further comprise instructions executable by the processor to: transmit the sidelink packet without performing channel sensing and resource selection within the RSL-USS prior to transmitting the sidelink packet to the second UE.

* * * * *